United States Patent
Fakoorian et al.

(10) Patent No.: US 12,490,280 B2
(45) Date of Patent: Dec. 2, 2025

(54) USER EQUIPMENT AGGREGATION FOR DOWNLINK COMMUNICATIONS

(71) Applicant: Apple Inc., Cupertino, CA (US)

(72) Inventors: Seyed Ali Akbar Fakoorian, San Diego, CA (US); Chunhai Yao, Beijing (CN); Chunxuan Ye, San Diego, CA (US); Dawei Zhang, Saratoga, CA (US); Haijing Hu, Los Gatos, CA (US); Haitong Sun, Cupertino, CA (US); Huaning Niu, San Jose, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/802,136

(22) PCT Filed: Sep. 24, 2021

(86) PCT No.: PCT/CN2021/120389
§ 371 (c)(1),
(2) Date: Aug. 24, 2022

(87) PCT Pub. No.: WO2023/044775
PCT Pub. Date: Mar. 30, 2023

(65) Prior Publication Data
US 2024/0237029 A1    Jul. 11, 2024

(51) Int. Cl.
*H04W 72/25* (2023.01)
*H04L 5/00* (2006.01)
(Continued)

(52) U.S. Cl.
CPC ........... *H04W 72/25* (2023.01); *H04L 5/0055* (2013.01); *H04W 72/21* (2023.01); *H04W 88/04* (2013.01)

(58) Field of Classification Search
CPC ..... H04W 72/25; H04W 72/21; H04W 88/04; H04L 5/0055; H04L 1/1864; H04L 1/1671; H04L 2001/0097
(Continued)

(56) References Cited

U.S. PATENT DOCUMENTS

2018/0324882 A1    11/2018   Gulati et al.
2019/0342921 A1    11/2019   Loehr et al.
(Continued)

FOREIGN PATENT DOCUMENTS

CN    106576354 A    4/2017
CN    108702751 A    10/2018
(Continued)

OTHER PUBLICATIONS

Considerations on Resource Allocation for UE-to-Network Relays, 3GPP TSG RAN WG1 Meeting #82, ITL Inc., R1-154548, Aug. 28, 2015, 4 pages.
(Continued)

*Primary Examiner* — Candal Elpenord
*Assistant Examiner* — Syed M Bokhari
(74) *Attorney, Agent, or Firm* — Kilpatrick Townsend & Stockton LLP

(57) ABSTRACT

The present application relates to devices and components including apparatus, systems, and methods for UE aggregation for downlink communications in wireless networks.

16 Claims, 9 Drawing Sheets

(51) Int. Cl.
   *H04W 72/21*      (2023.01)
   *H04W 88/04*      (2009.01)
(58) Field of Classification Search
   USPC .......................................................... 370/315
   See application file for complete search history.

(56) References Cited

U.S. PATENT DOCUMENTS

| | | | |
|---|---|---|---|
| 2020/0053767 A1 | 2/2020 | Bai et al. | |
| 2020/0154490 A1* | 5/2020 | Xiang | H04W 72/121 |
| 2020/0267751 A1* | 8/2020 | Shi | H04W 68/00 |
| 2020/0337021 A1 | 10/2020 | Zhang et al. | |
| 2020/0383136 A1* | 12/2020 | Xie | H04W 16/28 |
| 2021/0135796 A1* | 5/2021 | Fong | H04L 1/1819 |
| 2021/0153238 A1 | 5/2021 | Zhou et al. | |
| 2021/0195573 A1* | 6/2021 | Wang | H04W 88/04 |
| 2021/0266136 A1* | 8/2021 | Baldemair | H04L 5/001 |
| 2021/0328725 A1* | 10/2021 | Jassal | H04L 1/1614 |
| 2022/0312377 A1* | 9/2022 | Takeda | H04L 1/1822 |
| 2023/0246756 A1* | 8/2023 | Khoshnevisan | H04B 7/26 370/329 |
| 2023/0246760 A1* | 8/2023 | Khoshnevisan | H04W 72/51 370/329 |
| 2024/0120987 A1* | 4/2024 | Yuan | H04B 7/0874 |
| 2024/0244635 A1* | 7/2024 | Yuan | H04W 72/232 |
| 2024/0340149 A1* | 10/2024 | Lei | H04L 5/0055 |

FOREIGN PATENT DOCUMENTS

| | | |
|---|---|---|
| CN | 109792778 A | 5/2019 |
| CN | 109863809 A | 6/2019 |
| CN | 110099423 A | 8/2019 |
| CN | 110290592 A | 9/2019 |
| CN | 110603892 A | 12/2019 |
| CN | 110832926 A | 2/2020 |
| CN | 111901847 A | 11/2020 |
| CN | 112042141 A | 12/2020 |
| WO | 2018095297 A1 | 5/2018 |
| WO | 2021109013 A1 | 6/2021 |

OTHER PUBLICATIONS

International Patent Application No. PCT/CN2021/120496, International Search Report and Written Opinion, Mailed on Jun. 23, 2022, 9 pages.
Discussion on Network Assisted UE Cooperation for Rel-17, Huawei, HiSilicon, 3GPP TSG RAN Meeting #83, RP-190491, Mar. 18-21, 2019, 2 pages.
International Patent Application No. PCT/CN2021/120389, International Search Report and Written Opinion, Mailed on Jun. 21, 2022, 9 pages.
Study on UE Aggregation for Industry with Multi-connectivity, Vivo, Aug. 19, 2021, 8 pages.
3rd Generation Partnership Project; Technical Specification Group Radio Access Network; NR; Multiplexing and channel coding (Release 16), 3GPP TS 38.212 V16.6.0, Jun. 2021, 153 pages.
3rd Generation Partnership Project; Technical Specification Group Radio Access Network; NR; Physical layer procedures for control (Release 16), 3GPP TS 38.213 V16.6.0, Jun. 2021, 187 pages.
3rd Generation Partnership Project; Technical Specification Group Radio Access Network; NR; Physical layer procedures for data (Release 16), 3GPP TS 38.214 V16.6.0, Jun. 2021, 173 pages.
3rd Generation Partnership Project; Technical Specification Group Radio Access Network; NR; Radio Resource Control (RRC) protocol specification (Release 16), 3GPP TS 38.331 V16.5.0, Jun. 2021, 959 pages.
Enhanced support for personal IOT network in Rel 18, Vivo, 3GPP TSG RAN Rel-18 workshop, RWS-210172, Jun. 28-Jul. 2, 2021, 6 pages.
Motivation of study for UE Aggregation, CMCC, 3GPP TSG RAN Rel-18 workshop, RWS-210355, Jun. 28-Jul. 2, 2021, 5 pages.
UE Aggregation, Huawei, HiSilicon, 3GPP TSG RAN Meeting #92-e, RWS-210451, Jun. 14-18, 2021, 3 pages.
Uplink Enhancements for 5G Advanced, ZTE, Sanechips, 3GPP TSG RAN Rel-18 workshop, RWS-210479, Jun. 28-Jul. 2, 2021, 10 pages.
InterDigital's Views on Rel-18 Scope for NR-Advanced, InterDigital, 3GPP TSG RAN Rel-18 Workshop, RWS-210422, Jun. 28-Jul. 2, 2021, 17 pages.
Views on UL Enhancements in Rel-18, FGI, Asia Pacific Telecom, 3GPP TSG RAN Rel-18 workshop, RWS-210192, Jun. 28-Jul. 2, 2021, 6 pages.
Uplink Enhancements, Rakuten Mobile, 3GPP TSG RAN Rel-18 workshop, RWS-210199, Jun. 28-Jul. 2, 2021, 6 pages.
International Patent Application No. PCT/CN2021/120389, International Preliminary Report on Patentability, Apr. 4, 2024, 6 pages.
International Patent Application No. PCT/CN2021/120496, International Preliminary Report on Patentability, Apr. 4, 2024, 5 pages.
Addition of sTTI Related Definitions, Symbols and Abbreviations to TS 36.521-1, Huawei, HiSilicon, 3rd Generation Partnership Project Technical Specification Group-Radio Access Network 5, Meeting #88-e, R5-203927, Aug. 17-28, 2020, 8 pages.
China Patent Application No. 202180019328.6, Notice of Decision to Grant, Mailed on Dec. 6, 2024, 8 pages.
China Patent Application No. 202180019328.6, Office Action, Mailed on Jul. 18, 2024, 12 pages.
Resource Allocation Mechanism, 3rd Generation Partnership Project Technical Specification Group Radio Access Network Working Group 1, Meeting #95, R1-1812872, Nov. 12-16, 2018, 11 pages.
China 202180019526.2, Office Action, Mar. 13, 2025, 28 pages.
China Patent Application No. 202180019526.2, Notice of Decision to Grant, Aug. 19, 2025, 7 pages.

* cited by examiner

USER EQUIPMENT AGGREGATION FOR DOWNLINK COMMUNICATIONS

CROSS-REFERENCE TO RELATED APPLICATION

This application is a 371 U.S. National Phase of PCT International Patent Application No. PCT/CN2021/120389, filed Sep. 24, 2021, which is herein incorporated by reference in its entirety for all purposes.

BACKGROUND

Third Generation Partnership Project (3GPP) Technical Specifications (TSs) define standards for New Radio (NR) wireless networks. These TSs describe aspects related to user plane and control plane signaling over the networks.

DETAILED DESCRIPTION

Figure 1:
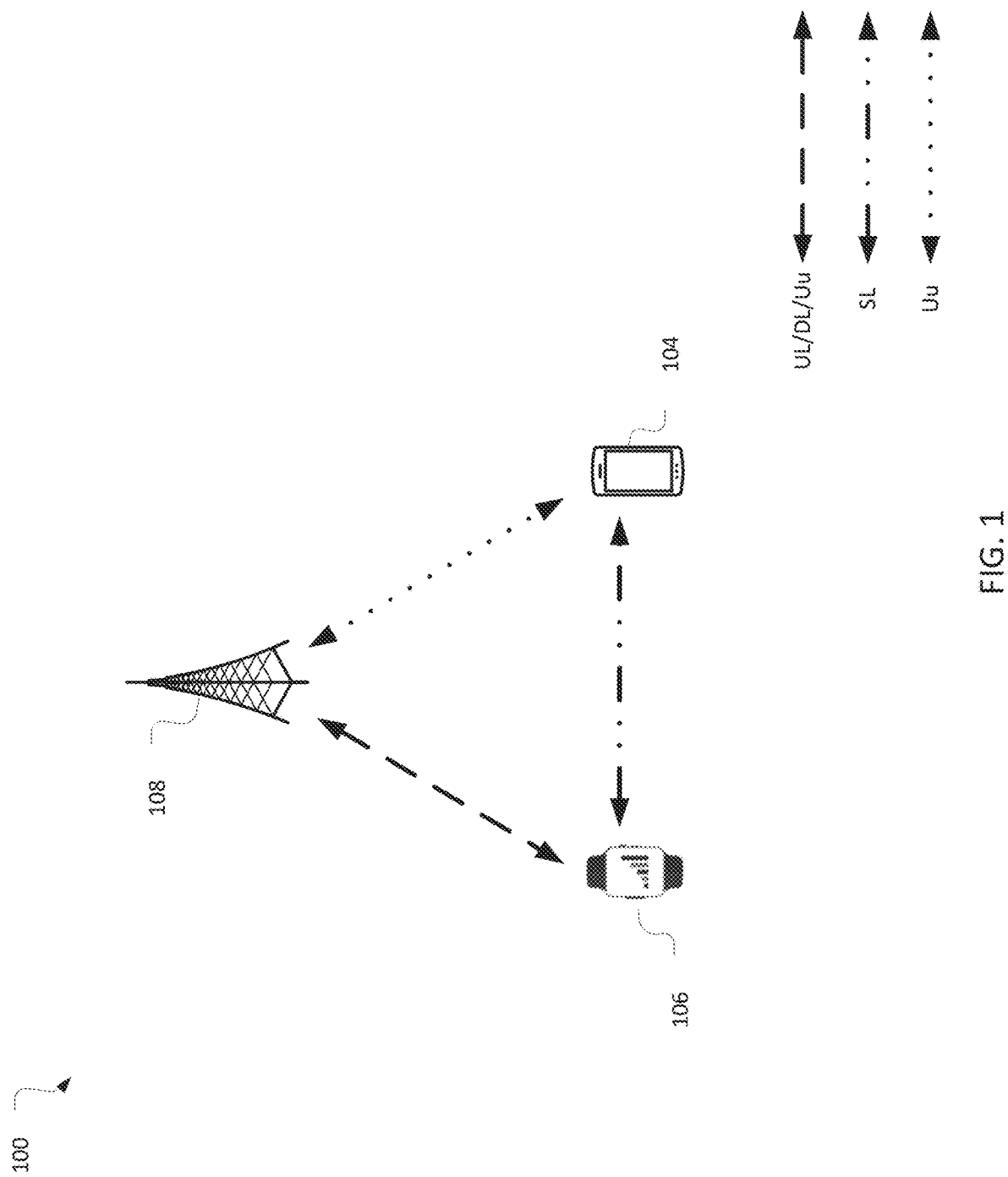
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include user equipments (UEs) 104 and 106 and a base station 108 of a radio access network (RAN). The base station 108 may be next generation node B (gNB) to provide one or more 5G New Radio (NR) cells to provide NR user plane and control plane protocol terminations toward the UEs 104/106.

The UEs 104/106 may be an aggregated group that cooperates to improve uplink or downlink communications. For example, the UEs 104/106 may operate as a virtual UE that includes more platform resources than the UEs 104/106 do individually. In this manner, the UE aggregation may provide more transmit power, antenna/RF chains, antenna diversity, etc.

The aggregated UEs may include a target UE and one or more assistant UEs. The uplink/downlink communications performed by the assistant UEs may be for the benefit of the target UE that is the source or destination of the communicated information. For embodiments described herein, the UE 104 may be considered the target UE and the UE 106 may be considered the assistant UE. However, these roles may be dynamic and may change over time. The target UE 104 and the assistant UE 106 may belong to the same user or may belong to different users. The target UE 104 is shown generally as a mobile phone, while the assistant UE 106 is shown generally as a smart watch. These depictions are not restrictive. In other embodiments, other types of UEs may be used as target/assistant UEs.

The UEs 104/106 and the base station 108 may communicate over air interfaces compatible with 3GPP TSs such as those that define Fifth Generation (5G) NR system standards. In some embodiments, the target UE 104 may communicate with the base station 108 over a Uu interface and may further communicate with the assistant UE 106 over a sidelink (SL) interface. The sidelink interface may be any type of wired or wireless interface. For example, the sidelink interface may be an interface of a wireless personal area network technology, a wireless local area network technology, or a wireless wide area network technology.

In some embodiments, the assistant UE 106 may be camped on a cell provided by the base station 108. In these embodiments, the assistant UE 106 may also communicate with the base station 108 over a Uu interface. In other embodiments, the assistant UE 106 may not be camped on a cell provided by the base station 108 and may, therefore, be hidden from the base station 108. In these embodiments, the assistant UE 106 may not be able to communicate with the base station 108 over an established Uu interface, but may still be configured to receive information from, or transmit information to, the base station 108 as will be described.

Figure 2:
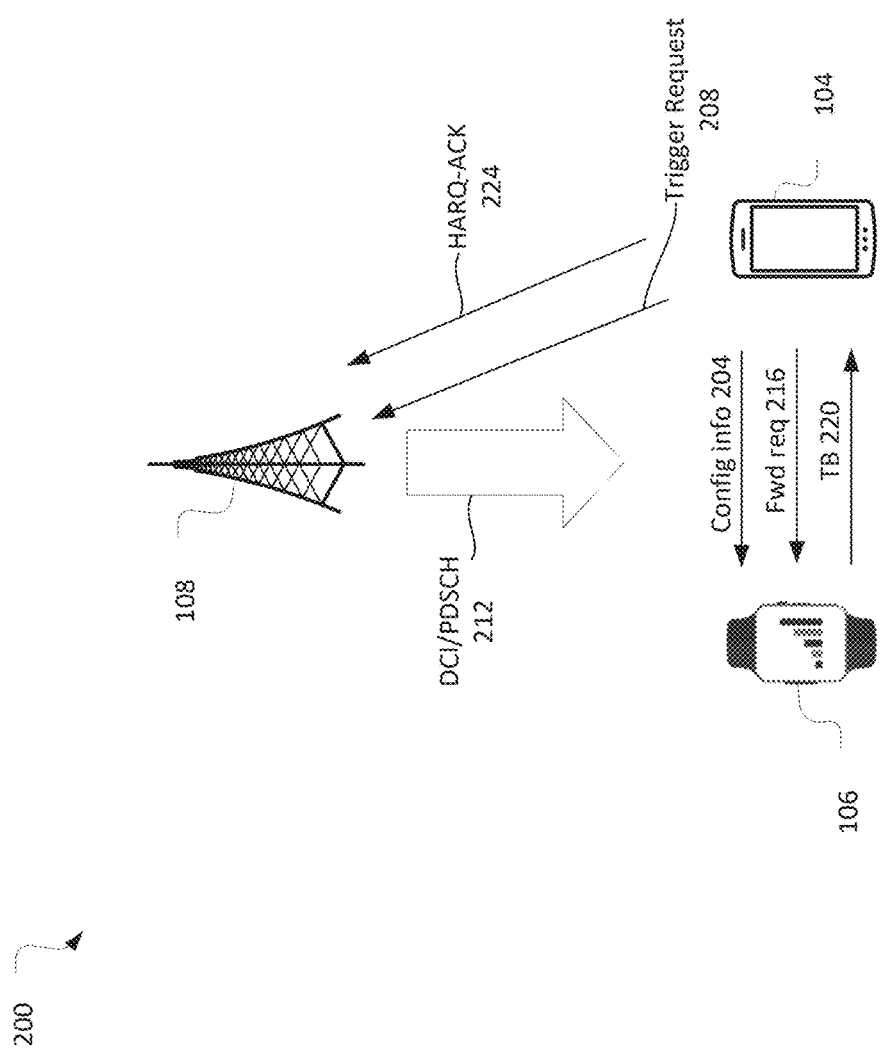
FIG. 2 illustrates a message flow in accordance with some embodiments.

FIG. 2 illustrates a message flow 200 in accordance with some embodiments. The message flow 200 may be performed in situations in which the assistant UEs are hidden from the base station 108. However, similar concepts may also be used in situations in which the assistant UEs are camped on a cell provided by the base station 108.

The target UE 104 may identify one or more assistant UEs, including the assistant UE 106, with which to form a UE aggregate. Various criteria may be used by the target UE 104 to identify the assistant UEs. The criteria may include UEs that belong to a common user. The criteria may additionally/alternatively include UEs that are within a predetermined range from the target UE 104 or have a predetermined sidelink quality with the target UE 104. The criteria may additionally/alternatively include UEs that have declared they are able to assist. This declaration may be through a physical sidelink shared channel (PSSCH) transmission, a sidelink-synchronization signal block (S-SSB) transmission, etc. The criteria may additionally/alternatively include UEs that are relatively stationary with respect to the target UE 104. For example, the target UE 104 may only select UEs as assistant UEs if they are expected to be within a predetermined proximity for a predetermined period of time. Thus, it may be desirable that the assistant UEs have a relatively low mobility with respect to the target UE 104. The criteria may additionally/alternatively include UEs that have sufficient processing capabilities. The processing capabilities may be, for example, transmit power, uplink/downlink processing power, a predetermined number of transmit or receive antennas, etc. In some embodiments, the target UE 104 may not select an assistant UE with processing capabilities that are below the capabilities of the target UE 104 itself. However, in some embodiments an assistant UE with processing capabilities less than the target UE 104 may still be selected by the target UE 104 and may be able to contribute by increasing, for example, spatial receive diversity.

At 204, the target UE 104 may transmit configuration information to the assistant UE 106. The configuration information may be information that is sufficient to enable the assistant UE 106 to decode downlink communications (for example, downlink 30) control information (DCI), physical downlink shared channel (PDSCH) transmissions, etc.) from the base station 108 to the target UE 104. The configuration information may include radio network temporary identifiers (RNTIs), indications of configured/activated bandwidth parts (BWPs) upon which the target UE 104 is operating, physical downlink control channel (PDCCH) configurations, PDSCH configurations, expected time to receive downlink communications from the base station 108, etc.

The PDCCH configurations may include control resource and search space information sufficient to allow the assistant UE to identify and properly decode PDCCH transmissions. The PDSCH configurations may include demodulation reference signal (DMRS) information (for example, number of DMRS symbols in a slot, DMRS format, etc.) and other information to allow the assistant UE 106 to identify and properly decode PDSCH transmissions.

In some embodiments, the expected time to receive downlink communications from the base station 108 may be the time at which the target UE 104 expects to receive the downlink communications. In the event the target UE 104 and assistant UE 106 are in close proximity, the assistant UE 106 may use the same expected receive time as the target UE 104. If the target UE 104 and the assistant UE 106 are communicating over a relatively large distance, the assistant UE 106 may use the expected timing that the target UE 104 is to receive the downlink communications along with relative positioning information of the target UE 104 and the assistant UE 106 to determine a time at which the assistant UE 106 is expected to receive the downlink communications.

At 208, the target UE 104 may send a trigger request message to the base station 108 to request that an aggregation mode be activated. In some embodiments, the trigger request message may be uplink control information (UCI) that is transmitted in a physical uplink control channel (PUCCH) transmission, an extended hybrid automatic repeat request (HARQ)-acknowledgment (ACK) transmission, a special scheduling request (SR), or a special physical random access channel (PRACH) transmission.

In some embodiments, the trigger request may be transmitted in response to the target UE 104 unsuccessfully decoding an initial PDSCH transmission from the base station 108. In some embodiments, instead of sending a one-bit HARQ-ACK to indicate that the PDSCH transmission was not successfully received, the target UE 104 may send a two-bit HARQ-ACK, where the first bit corresponds to the acknowledgment/negative acknowledgment bit of a typical HARQ-ACK transmission and the second bit indicates whether the target UE 104 is requesting to enter an aggregation mode.

In some embodiments, the trigger request message may simply include an indication of a request to enter (or exit from) the aggregation mode. In other embodiments, the trigger request message may additionally/alternatively include a desired time to process all PDSCH transmissions (including those received directly from the base station 108 and those received from assistant UEs). In still other embodiments, the trigger request message may additionally/alternatively include HARQ-ACK for a PDSCH transmission (as described above).

In some embodiments, the trigger request message may additionally/alternatively include information to facilitate retransmission of the PDSCH to facilitate both the target UE 104 and the assistant UE 106 receiving the PDSCH transmission. For example, the target UE 104 may provide the base station 108 with a transmission configuration indicator (TCI) to configure the downlink transmission with the desired properties.

At 212, the base station 108 may transmit scheduling DCI and the scheduled PDSCH. The DCI/PDSCH may be transmitted to the target UE 104, but also aim to be received by the assistant UE 106. For example, the base station 108 may transmit the DCI/PDSCH based on the TCI provided by the target UE 104. For another example, the base station 108 may transmit the DCI/PDSCH with a spatial beam that is wider than the spatial beam used for the initial transmission. The wider spatial beam may facilitate reception by both the target UE 104 and the assistant UE 106. In yet another example, the base station 108 may transmit multiple DCIs/PDSCHs, with each DCI/PDSCH intended for a different UE of the aggregated UEs. These DCIs/PDSCHs may be transmitted with different or common spatial beams. The multiple PDSCH transmissions may include the same transport block(s) that are directed to the target UE 104.

At 216, the target UE 104 may transmit a forwarding request message to the assistant UE 106. The forwarding request message may request that the assistant UE 106 (re)transmits any transport block the assistant UE 106 was able to correctly decode.

In some embodiments, the forwarding request message may be a message transmitted on the sidelink (for example, a PSCCH transmission). In other embodiments, if the assistant UE 106 is able to decode the PUCCH from the target UE 104, the forwarding request message may be a NACK transmission on the PUCCH. For example, the trigger request transmitted at 208 may serve to both indicate that an initial PDSCH transmission was not successfully received by the target UE 104 and request that the assistant UE 106 (re)transmits successfully decoded transport blocks.

At 220, the assistant UE 106 may forward the transport block to the UE. This may be based on the forwarding request message. The transport block may be forwarded on preconfigured sidelink resources or the same resources indicated by the base station 108 for the initial transmission. The assistant UE 106 may transmit the transport block in the form of a Uu transmission (for example, a PUSCH) or a sidelink transmission (for example, PSSCH). For example, the transport block may be transmitted to the target UE 104 on uplink symbols. Various embodiments may account for modulation and coding scheme (MCS) and interference management aspects in the forwarding of the transport blocks.

In some embodiments, instead of having a specific request to forward the transport block (at 216 or 208), the assistant UE 106 may automatically retransmit the transport block to the target UE 104. For example, after receiving the configuration information at 204, the assistant UE 106 may begin forwarding successfully decoded transport blocks to the target UE 104 based on a preconfigured timeline after decoding the PDSCH transmissions. The target UE 104 may forward the successfully decoded transport blocks on preconfigured time/frequency resources.

At 224, the UE 104 may transmit a HARQ-ACK based on the retransmitted PDSCH. In the event the UE 104 does not successfully decode the retransmitted PDSCH as received directly from the base station 108, it may postpone transmission of the HARQ-ACK until it has received and processed the transport block from the assistant UE 106.

Figure 3:
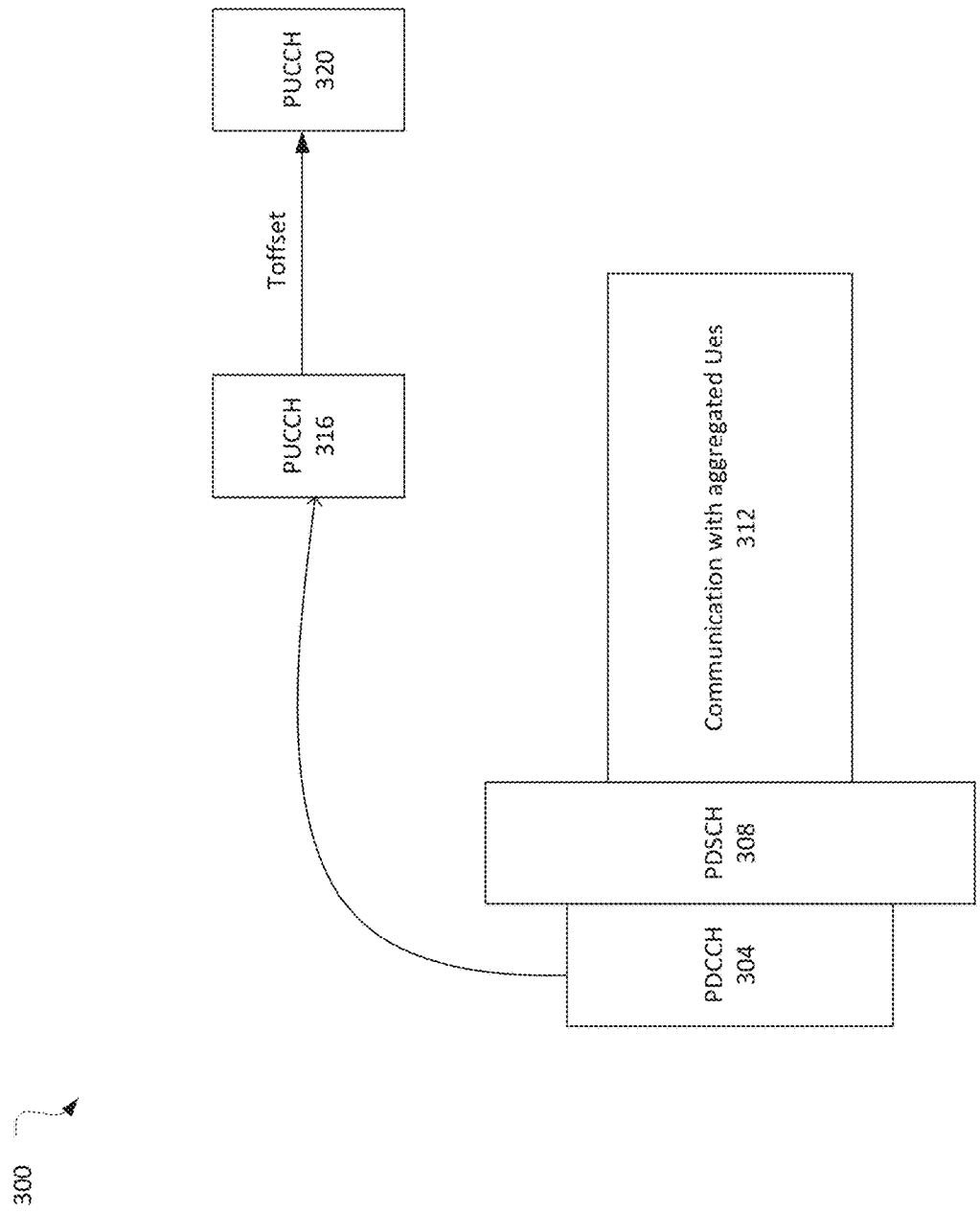
FIG. 3 illustrates a signaling diagram in accordance with some embodiments.

FIG. 3 illustrates a signaling diagram 300 in accordance with some embodiments.

The signaling diagram 300 illustrates a PDCCH 304 that may be received by the target UE 104. The PDCCH 304 may schedule a PDSCH 308 to be received by the target UE 104. In some embodiments, the target UE 104 may be operating in an aggregation mode and may not successfully receive the PDSCH 308 directly from the base station 108. Thus, the target UE 104 may communicate with aggregated UEs at 312 to receive the (re)transmitted PDSCH.

The PDCCH 304 may be associated with a PUCCH 316 that is designated for transmitting HARQ-ACK corresponding to reception of the PDSCH 308. For example, the PDCCH 304 may indicate a time of the PUCCH 316 by providing a K1 value. However, if at the indicated time the target UE 104 is still communicating with the aggregated UEs at 312 in an attempt to properly receive the PDSCH, the target UE 104 may not be ready for transmitting the HARQ-ACK in the PUCCH 316. Thus, various embodiments describe processes in which the transmission of the HARQ-ACK may be delayed.

In a first option, the target UE 104 may transmit a special NACK (for example, 00 instead of 0) on the PUCCH resource 316 to indicate that the target UE 104 is not ready to send the true HARQ-ACK information. The second PUCCH resource, PUCCH 320, that is offset by Toffset from PUCCH 316 may then be triggered. The value of Toffset may be pre-configured or dynamically configured by the network and known to the target UE 104. If the target UE 104 is still not ready to send the true HARQ-ACK information in the PUCCH 320, it may again send the special NACK and the delay process may repeat.

In a second option, the target UE 104 may transmit a special NACK on the PUCCH 316 to indicate a desired offset to the PUCCH 320. In some embodiments, the special NACK may provide an indication of one or more preconfigured offset possibilities that are to be used.

As discussed above, in some of the embodiments both the target UE 104 and the assistant UE 106 may be camped on a cell provided by the base station 108. In these embodiments, the base station may provide a more active role in establishing the UE aggregation and communicating with the assistant UEs. For example, assisted UEs may be selected by the target UE 104 as described above. However, the target UE 104 may then transmit a suggestion to the base station 108 of the UEs to be included as assistant UEs. In other embodiments, the base station 108 may select the UEs to be included as the assistant UEs. This may allow for UEs that are not already in an established communication with one another to participate in a UE aggregation.

For the downlink transmissions, the base station 108 may multicast the transport block to the aggregated UEs (for example, the target UE 104 and the assistant UE 106). This may be accomplished in a number of ways.

In some embodiments, the aggregated UEs may have a common identifier. For example, the aggregated UEs may all be associated with a group-RNTI (G-RNTI). The base station 108 may then transmit DCI having cyclic redundancy check (CRC) bits scrambled with the G-RNTI. The aggregated UEs may decode the DCI to determine that it is relevant to the aggregation and may identify a PDSCH transmission scheduled by the DCI.

In some embodiments, information about the aggregated UEs may be signaled with a group common-DCI (GC-DCI). For example, the GC-DCI may include a list of UE identifiers corresponding to the aggregated UEs, The first UE identifier in the list of identifiers may identify the target UE 104 to which the PDSCH scheduled by the GC-DCI is to be transmitted. The remaining identifiers in the list may correspond to assistant UEs. Thus, by receiving the GC-DCI, each of the aggregated UEs will know the destination of the transport block and the role the UE is to play in the aggregation (for example, as an assistant or a target).

In some embodiments, PUCCH resources for HARQ-ACK from each of the aggregated UEs may be RRC mapped to the aggregated UEs. The mapping may be with respect to the ordered list of identifiers in the GC-DCI. For example, a UE may receive RRC configuration information that maps a target UE to a first PUCCH resource, a first assistant UE to a second PUCCH resource, a second assistant UE to a third PUCCH resource, and so on. When the UEs receive a GC-DCI that schedules a PDSCH transmission, the receiving UE may know which PUCCH resource it is to use for HARQ-ACK feedback based on the position of its identifier in the list. Upon receiving the HARQ-ACK feedback, the base station 108 may know which UEs successfully received the PDSCH transmission based on the PUCCH resource used to transmit the HARQ-ACK feedback.

In some embodiments, the DCI may only indicate one PUCCH resource that may be used for an assistant UE transmitting HARQ-ACK.

In some embodiments, different DCIs/PDSCHs (including the same transport block) may be transmitted to different aggregated UEs. This option may be associated with a relatively higher overhead, but may also provide some additional flexibility/reliability.

Figure 4:
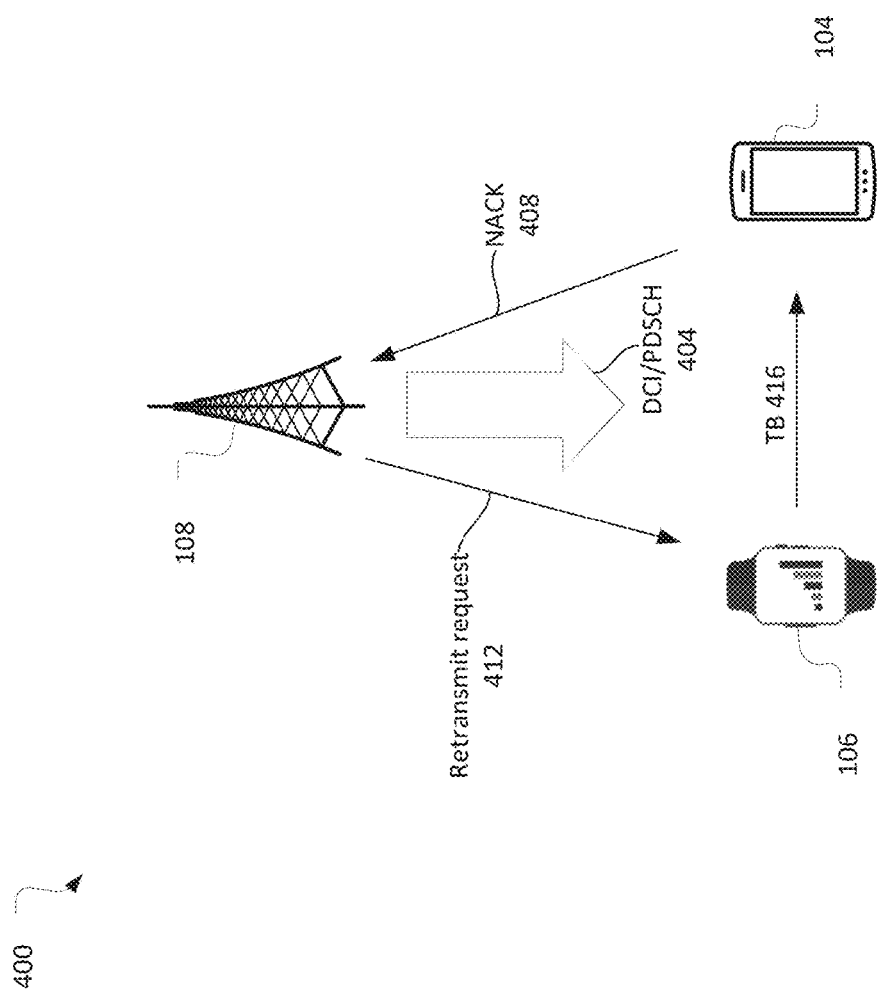
FIG. 4 illustrates another signaling diagram in accordance with some embodiments.

FIG. 4 illustrates a signaling diagram 400 in accordance with some embodiments. The signaling diagram 400 may be used in embodiments in which the assistant UE 106 is camped on a cell provided by the base station 108.

After the UE aggregation is established and the aggregation mode is activated, the base station 108 may transmit DCI/PDSCH 404 to both the target UE 104 and the assistant UE 106. If the target UE 104 does not successfully receive the PDSCH transmission, it may transmit a NACK at 408. Upon receiving the NACK (or not receiving an expected ACK), the base station 108 may then transmit a retransmit request 412 to the assistant UE 106. The retransmit request 412 may include a specific HARQ-ID associated with the transport block that is to be forwarded to the target UE 104. The assistant UE 106 may then, at 416, (re)transmit the transport block (received from PDSCH transmitted at 404) to the target UE 104.

In some embodiments, the base station 108 may schedule the resources (in time and frequency) that may be used by the assistant UE 106 to (re)transmit the transport block to the target UE 104. This may be similar to mode-1 sidelink resource allocation.

In some embodiments, the base station 108 may include, in the retransmit request 412, an indication of a timeline for the assistant UE 106 to (re)transmit the transport block at 416. The frequency domain resources used to (re)transmit the transport block at 416 may be the same resources upon which the assistant UE 106 originally received the transport block in PDSCH 404.

In some embodiments, the assistant UE 106 may (re)transmit the transport block to the target UE 104 without a further indication, similar to that discussed above with respect to FIG. 2.

Figure 5:
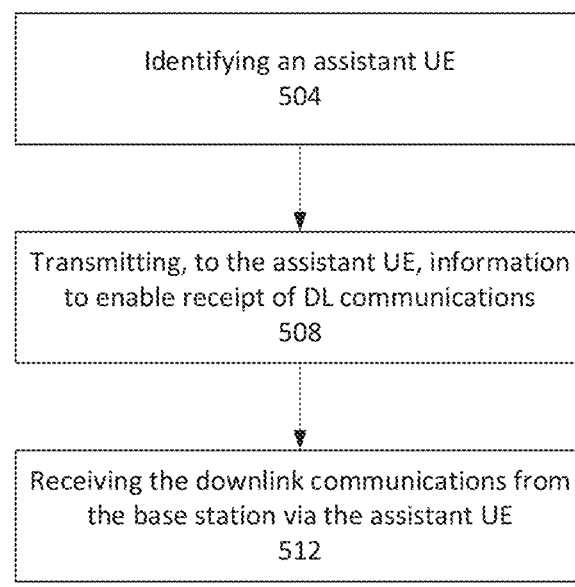
FIG. 5 illustrates an operation flow/algorithmic structure in accordance with some embodiments.

FIG. 5 provides an operation flow/algorithmic structure 500 in accordance with some embodiments. The operation flow/algorithmic structure 500 may be performed/implemented by a UE such as, for example, target UE 104 or UE 800 or by components thereof, for example, processors 804.

The operation flow/algorithmic structure 500 may include, at 504, identifying an assistant UE. The assistant UE may be identified for inclusion in an aggregated group of UEs that includes a target UE. The aggregated group may be used to facilitate downlink communications to the target UE. In some embodiments, the assistant UE may be identified by proximity to the target UE, capabilities of the assistant UE, signal connection with the assistant UE, ownership status of the UE (for example, both assistant UE and target UE corresponding to the same user), etc.

The operation flow/algorithmic structure 500 may further include, at 508, transmitting, to the assistant UE, information to enable receipt of downlink communications. The information may be configuration information such as RNTIs, bandwidth parts configured for the target UE, PDCCH/PDSCH configurations for the target UE, or a time in which the target UE expects to receive downlink communications.

In some embodiments, the target UE may also transmit information to the assistant UE to facilitate transmission of downlink communications from the assistant UE to the target UE. For example, the target UE may provide an indication of preconfigured resources (in time and frequency) that the assistant UE may use to transmit information to the target UE.

The operation flow/algorithmic structure 500 may further include, at 512, receiving the downlink communications from the base station via the assistant UE. In some embodiments, the receipt of the downlink communications from the assistant UE may be in response to transmitting a specific request to the assistant UE via a sidelink control channel or transmitting a negative acknowledgment to the base station in an uplink control channel.

Figure 6:
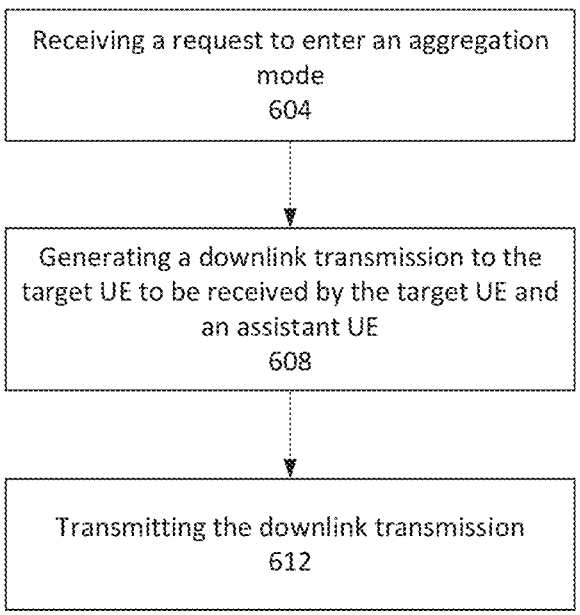
FIG. 6 illustrates another operation flow/algorithmic structure in accordance with some embodiments.

FIG. 6 provides an operation flow/algorithmic structure 600 in accordance with some embodiments. The operation flow/algorithmic structure 600 may be performed/implemented by a base station such as, for example, base station 108 or base station 900 or by components thereof, for example, processors 904.

The operation flow/algorithmic structure 600 may include, at 604, receiving a request to enter an aggregation mode. In some embodiments, the request may be part of HARQ feedback from a target UE that does not successfully receive a PDSCH transmission. In other embodiments, the request may be part of a scheduling request, a PRACH transmission, or UCI.

The operation flow/algorithmic structure 600 may further include, at 608, generating a downlink transmission to the target UE to be received by the target UE and an assistant UE. In some embodiments, the base station may use downlink parameters suggested for use by the target UE. In some embodiments, the downlink transmission may include DCI/PDSCH transmissions separately directed to the target UE and the assistant UE. The PDSCH transmissions may include the same transport block that is to be sent to the target UE.

The operation flow/algorithmic structure 600 may further include, at 612, transmitting the downlink transmission. In some embodiments, the base station may transmit the downlink transmission with a wider beam than beams used in the non-aggregation mode. In other embodiments, the base station may use different beams for the different aggregated UEs.

Figure 7:
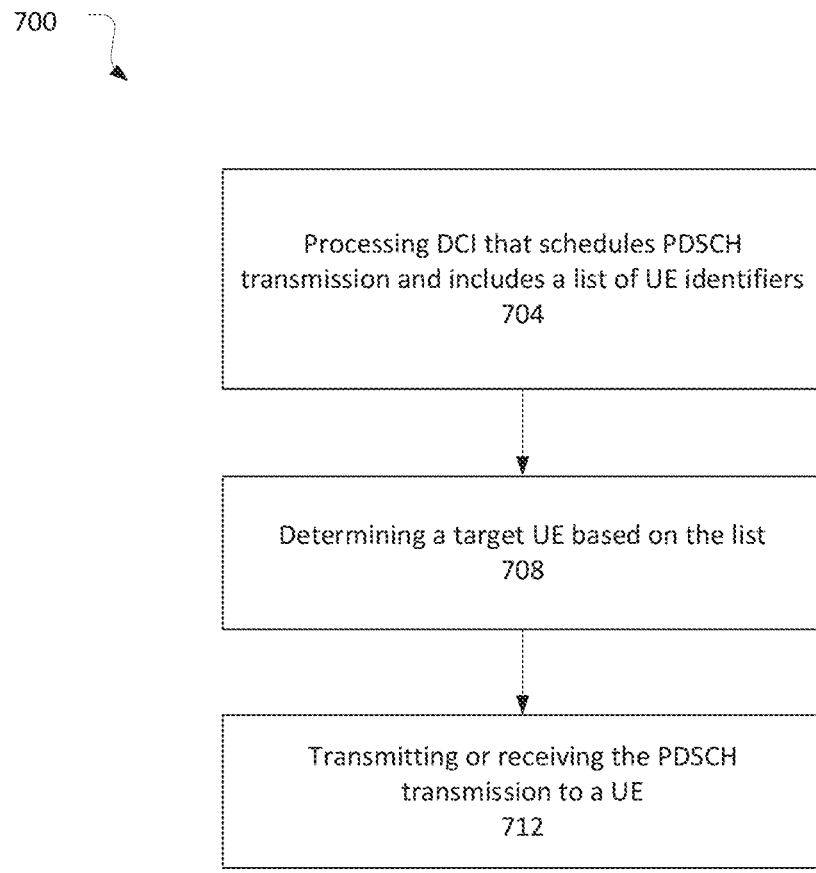
FIG. 7 illustrates another operation flow/algorithmic structure in accordance with some embodiments.

FIG. 7 provides an operation flow/algorithmic structure 700 in accordance with some embodiments. The operation flow/algorithmic structure 700 may be performed/implemented by a UE such as, for example, target UE 104, assistant UE 106, or UE 800 or by components thereof, for example, processors 804.

The operation flow/algorithmic structure 700 may include, at 704, processing DCI that schedules PDSCH transmission and includes a list of UE identifiers. The DCI may be GC-DCI or DCI having a CRC scrambled by a group RNTI. In some embodiments, the list of UE identifiers may be stored locally and the DCI may simply provide an index that references the list.

The operation flow/algorithmic structure 700 may further include, at 708, determining a target UE based on the list. For example, the first identifier in the list may correspond to the target UE. The remaining identifiers in the list may correspond to assistant UEs. The UE performing the operation flow/algorithmic structure 700 may determine where in the list its identifier is located. Based on this position, the UE may determine its role and the identity of the target UE.

The operation flow/algorithmic structure 700 may further include, at 712, transmitting or receiving the PDSCH transmission to a UE.

In the event the UE's identity is the first in the list, the UE may determine it is the target UE. It may attempt to receive the scheduled PDSCH transmission directly from the base station. If that is not successful, the target UE may receive the PDSCH transmission from one or more of the assistant UEs that were identified in the list. The assistant UEs may transmit the PDSCH as described elsewhere herein.

In the event the UE's identity is not the first in the list, the UE may determine it is an assistant UE. It may attempt to receive the schedule PDSCH transmission from the base station and either forward to the target UE automatically, or wait for an indication (from the base station or the target UE) to transmit the PDSCH transmission.

Figure 8:
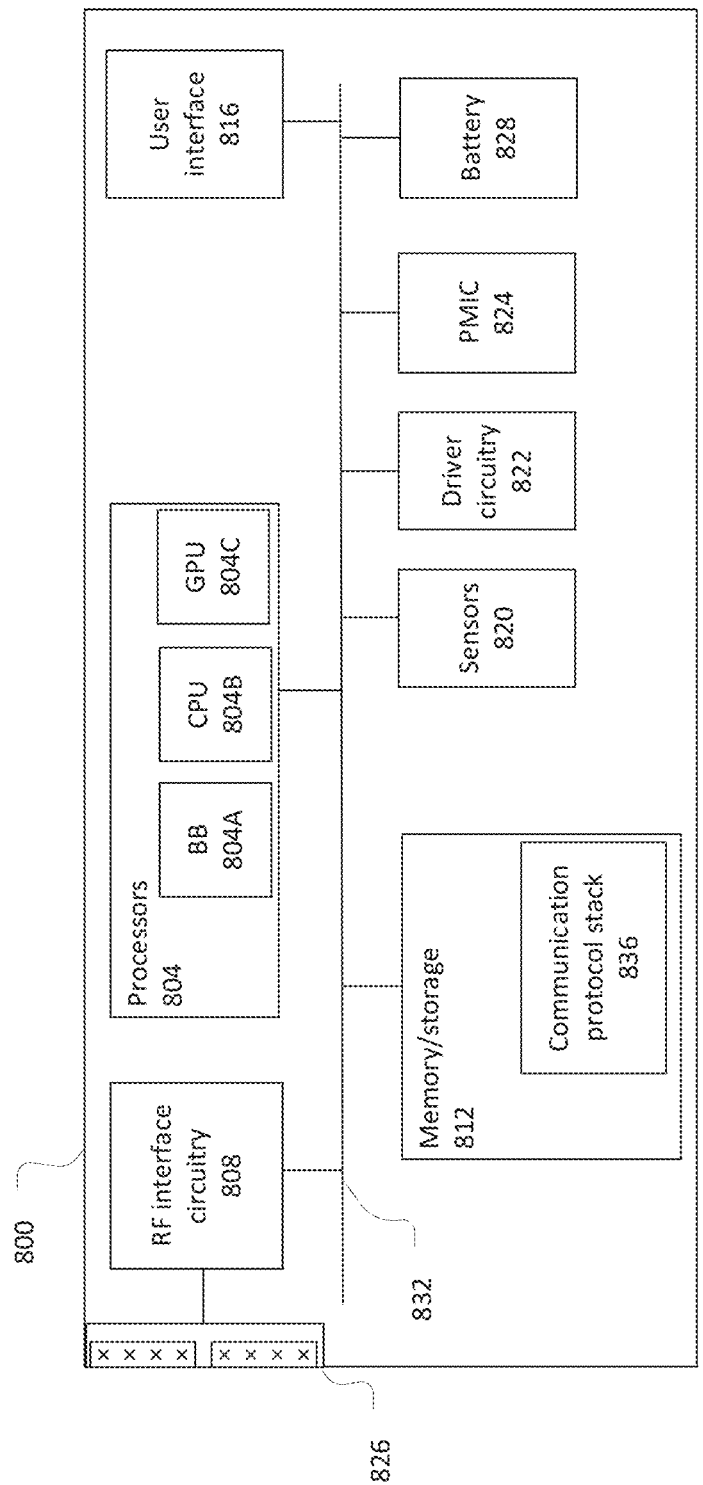
FIG. 8 illustrates a user equipment in accordance with some embodiments.

FIG. 8 illustrates a UE 800 in accordance with some embodiments. The UE 800 may be similar to and substantially interchangeable with target UE 104 or assistant UE 106.

The UE 800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 800 may include processors 804, RF interface circuitry 808, memory/storage 812, user interface 816, sensors 820, driver circuitry 822, power management integrated circuit (PMIC) 824, antenna structure 826, and battery 828. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangements of the components shown may occur in other implementations.

The components of the UE 800 may be coupled with various other components over one or more interconnects 832, which may represent any type of interface, input/output, bus (local, system, or expansion), transmission line, trace, or optical connection that allows various circuit components (on common or different chips or chipsets) to interact with one another.

The processors 804 may include processor circuitry such as, for example, baseband processor circuitry (BB) 804A, central processor unit circuitry (CPU) 804B, and graphics processor unit circuitry (GPU) 804C. The processors 804 may include any type of circuitry or processor circuitry that executes or otherwise operates computer-executable instructions, such as program code, software modules, or functional processes from memory/storage 812 to cause the UE 800 to perform operations as described herein.

In some embodiments, the baseband processor circuitry 804A may access a communication protocol stack 836 in the memory/storage 812 to communicate over a 3GPP compatible network. In general, the baseband processor circuitry 804A may access the communication protocol stack 836 to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a NAS layer. In some embodiments, the PHY layer operations may additionally/alternatively be performed by the components of the RF interface circuitry 808.

The baseband processor circuitry 804A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The memory/storage 812 may include one or more non-transitory, computer-readable media that include instructions (for example, communication protocol stack 836) that may be executed by one or more of the processors 804 to cause the UE 800 to perform various operations described herein. The memory/storage 812 includes any type of volatile or non-volatile memory that may be distributed throughout the UE 800. In some embodiments, some of the memory/storage 812 may be located on the processors 804 themselves (for example, L1 and L2 cache), while other memory/storage 812 is external to the processors 804 but accessible thereto via a memory interface. The memory/storage 812 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 808 may include transceiver circuitry and a radio frequency front module (RFEM) that allows the UE 800 to communicate with other devices over a radio access network. The RF interface circuitry 808 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 826 and proceed to filter and amplify (with a low-noise amplifier) the signal. The signal may be provided to a receiver of the transceiver that down-converts the RF signal into a baseband signal that is provided to the baseband processor of the processors 804.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 826.

In various embodiments, the RF interface circuitry 808 may be configured to transmit/receive signals in a manner compatible with NR and sidelink access technologies.

The antenna 826 may include antenna elements to convert electrical signals into radio waves to travel through the air and to convert received radio waves into electrical signals. The antenna elements may be arranged into one or more antenna panels. The antenna 826 may have antenna panels that are omnidirectional, directional, or a combination thereof to enable beamforming and multiple input, multiple output communications. The antenna 826 may include microstrip antennas, printed antennas fabricated on the surface of one or more printed circuit boards, patch antennas, or phased array antennas. The antenna 826 may have one or more panels designed for specific frequency bands including bands in FR1 or FR2.

The user interface circuitry 816 includes various input/output (I/O) devices designed to enable user interaction with the UE 800. The user interface 816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs), or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 800.

The sensors 820 may include devices, modules, or subsystems whose purpose is to detect events or changes in their environments and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detectors and the like); depth sensors; ambient light sensors; ultrasonic transceivers; and microphones or other like audio capture devices.

The driver circuitry 822 may include software and hardware elements that operate to control particular devices that are embedded in the UE 800, attached to the UE 800, or otherwise communicatively coupled with the UE 800. The driver circuitry 822 may include individual drivers allowing other components to interact with or control various input/output (I/O) devices that may be present within, or connected to, the UE 800. For example, driver circuitry 822 may include a display driver to control and allow access to a display device, a touchscreen driver to control and allow access to a touchscreen interface, sensor drivers to obtain sensor readings of sensor circuitry 820 and control and allow access to sensor circuitry 820, drivers to obtain actuator positions of electro-mechanic components or control and allow access to the electro-mechanic components, a camera driver to control and allow access to an embedded image capture device, audio drivers to control and allow access to one or more audio devices.

The PMIC 824 may manage power provided to various components of the UE 800. In particular, with respect to the processors 804, the PMIC 824 may control power-source selection, voltage scaling, battery charging, or DC-to-DC conversion.

A battery 828 may power the UE 800, although in some examples the UE 800 may be deployed in a fixed location, and may have a power supply coupled to an electrical grid. The battery 828 may be a lithium ion battery; a metal-air battery, such as a zinc-air battery; an aluminum-air battery; a lithium-air battery; and the like. In some implementations, such as in vehicle-based applications, the battery 828 may be a typical lead-acid automotive battery.

Figure 9:
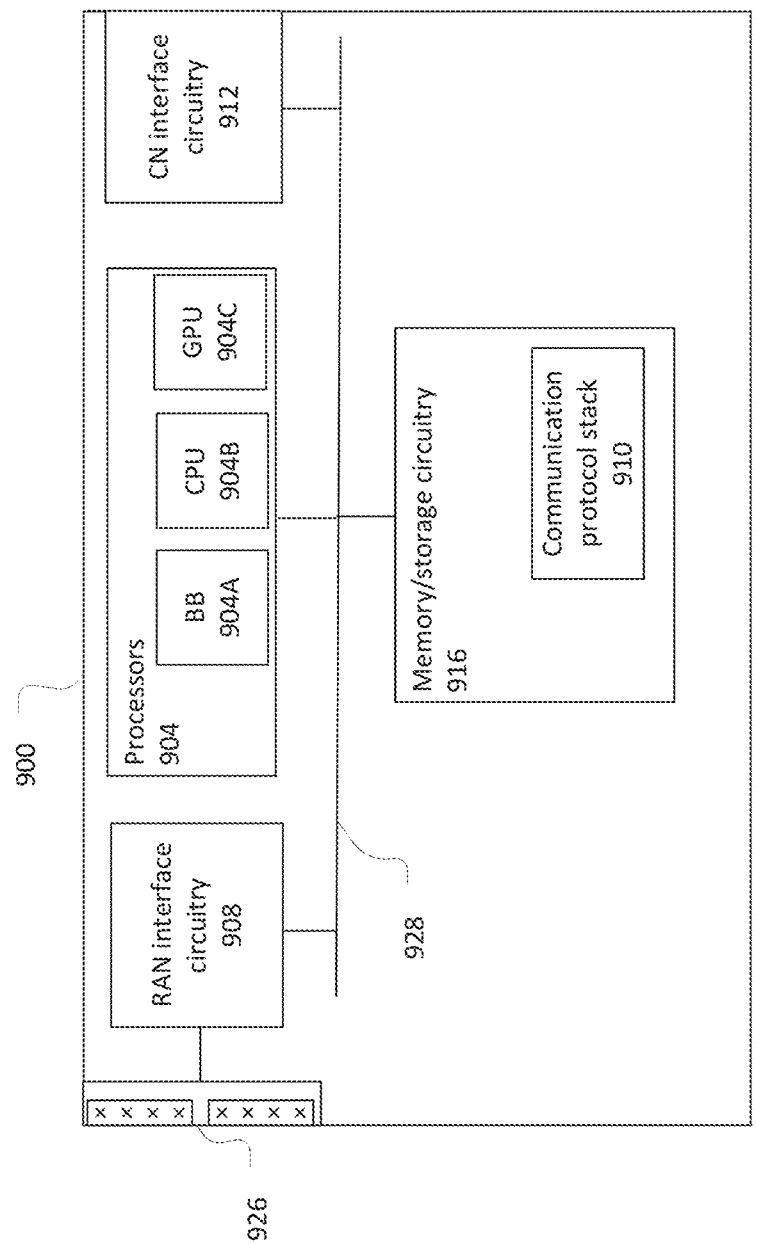
FIG. 9 illustrates a base station in accordance with some embodiments.

FIG. 9 illustrates a base station 900 in accordance with some embodiments. The base station 900 may be similar to and substantially interchangeable with base station 108.

The base station 900 may include processors 904, RF interface circuitry 908 (if implemented as a base station), core network (CN) interface circuitry 912, memory/storage circuitry 916, and antenna structure 926 (if implemented as a base station).

The components of the base station 900 may be coupled with various other components over one or more interconnects 928.

The processors 904, RF interface circuitry 908, memory/storage circuitry 916 (including communication protocol stack 910), antenna structure 926, and interconnects 928 may be similar to like-named elements shown and described with respect to FIG. 8.

The CN interface circuitry 912 may provide connectivity to a core network, for example, a 5th Generation Core network (5GC) using a 5GC-compatible network interface protocol such as carrier Ethernet protocols, or some other suitable protocol. Network connectivity may be provided to/from the base station 900 via a fiber optic or wireless backhaul. The CN interface circuitry 912 may include one or more dedicated processors or FPGAs to communicate using one or more of the aforementioned protocols. In some implementations, the CN interface circuitry 912 may include multiple controllers to provide connectivity to other networks using the same or different protocols.

In some embodiments, the base station 900 may be coupled with transmit receive points (TRPs) using the antenna structure 926, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

Examples

In the following sections, further exemplary embodiments are provided.

Example 1 includes a method of operating a target user equipment (UE), the method comprising: identifying an assistant UE; transmitting, to the assistant UE, information to enable the assistant UE to receive a downlink communication from a base station to the target UE; and receiving the downlink communication from the base station via the assistant UE.

Example 2 includes the method of example 1 or some other example herein, wherein the information includes one or more radio network temporary identifiers (RNTIs), a bandwidth part configured for the target UE; a physical downlink control channel (PDCCH) configuration for the target UE; a PDSCH configuration for the target UE; or an expected time to receive the downlink communication.

Example 3 includes the method of example 1 or some other example herein, wherein identifying the assistant UE comprises: determining the assistant UE and the target UE are associated with a same user; determining the assistant UE is within a predefined range from the target UE; determining the assistant UE has provided an indication that it is able to assist; determining an expected proximity of the assistant UE to the target UE; or determining the assistant UE has sufficient capabilities to assist.

Example 4 includes the method of example 1 or some other example herein, further comprising: transmitting, to the base station, a request to enter an aggregation mode, wherein the request is uplink control information, an extended hybrid automatic repeat request-acknowledgment (HARQ-ACK), a scheduling request, or a physical random access channel transmission.

Example 5 includes a method of example 4 or some other example herein, wherein transmitting the request comprises: transmitting an indication of a time required to process a physical downlink shared channel transmission and provide an acknowledgment.

Example 6 includes a method of example 4 or some other example herein, wherein transmitting the request comprises: transmitting an indication of a transmission configuration indicator requested for the downlink communication.

Example 7 includes the method of example 1 or some other example herein, further comprising: transmitting a request for the downlink communication to the assistant UE, wherein the request is transmitted as sidelink control information on a physical sidelink control channel or as negative-acknowledgment information on a physical uplink control channel.

Example 8 includes the method of example 1 or some other example herein, further comprising: transmitting, to the assistant UE, an indication of preconfigured resources to be used for transmitting the downlink communication to the target UE.

Example 9 includes the method of example 1 or some other example herein, wherein the downlink communication is a physical downlink shared channel (PDSCH) transmission and the method further comprises: receiving a physical downlink control channel (PDCCH) transmission that schedules the PDSCH transmission; receiving the PDSCH transmission from the assistant UE; generating hybrid automatic repeat request (HARQ)-acknowledgment (ACK) information related to receiving the PDSCH transmission; transmitting, in a first physical uplink control channel (PUCCH) resource allocated for the HARQ-ACK information, an indication that the HARQ-ACK information is not ready in time for transmission in the first PUCCH resource; and transmitting the HARQ-ACK information in a second PUCCH resource that is allocated for the HARQ-ACK information after the first PUCCH resource.

Example 10 includes a method of example 9 or some other example herein, wherein the indication is to provide an offset between the first PUCCH resource and the second PUCCH resource.

Example 11 includes the method of operating a base station, the method comprising: receiving, from a target user equipment (UE), a request to enter an aggregation mode with an assistant UE; generating a downlink transmission to the target UE to be received by the target UE and the assistant UE; and transmitting the downlink transmission.

Example 12 includes the method of example 11 or some other example herein, wherein the request comprises: uplink control information, an extended hybrid automatic repeat request-acknowledgment (HARQ-ACK), a scheduling request, or a physical random access channel transmission.

Example 13 includes the method of example 11 or some other example herein, wherein transmitting the downlink transmission comprises: transmitting the downlink transmission with a beam in the aggregation mode that is wider than a beam in a non-aggregation mode.

Example 14 includes the method of example 11 or some other example herein, wherein the downlink transmission comprises: first downlink control information and first physical downlink shared channel (PDSCH) transmission transmitted to the target UE; and second downlink control information and second PDSCH transmission transmitted to the assistant UE, wherein the first and second PDSCH transmission includes a common transport block for the target UE.

Example 15 includes a method of operating a user equipment (UE), the method comprising: processing downlink control information (DCI) that schedules a physical downlink shared channel (PDSCH) transmission and includes a list of a plurality of UE identifiers that respectively correspond to a plurality of UEs within a downlink aggregation group to which the PDSCH transmission is sent; and determining, based on an order of the list, a target UE of the plurality of UEs.

Example 16 includes the method of example 15 or some other example herein, further comprising: transmitting the PDSCH transmission to the target UE. The PDSCH transmission, which may or may not be based on a specific request for the PDSCH transmission from the target UE, may be transmitted on preconfigured time-domain or frequency-domain resources of PSSCH or a PUSCH.

Example 17 includes the method of example 15 or some other example herein, wherein the UE is the target UE, the plurality of UEs includes an assistant UE, and the method further comprises: receiving the PDSCH transmission from the assistant UE.

Example 18 includes the method of example 15 or some other example herein, wherein the DCI comprises a group common DCI or includes cyclic redundancy check bits scrambled with a group radio network temporary identity.

Example 19 includes the method of example 15 or some other example herein, further comprising: identifying physical uplink control channel (PUCCH) resources based on the list of the plurality of UEs; and transmitting hybrid automatic repeat request (HARQ)-acknowledgment (ACK) information corresponding to the PDSCH transmission in the PUCCH resources.

Example 20 includes a method of operating a base station, the method comprising: transmitting, to a target user equipment (UE), a transport block in a downlink transmission to the target UE and an assistant UE; determining the transport block was not successfully received by the target UE; and transmitting, to the assistant UE, a request to transmit the transport block to the target UE.

Example 21 includes the method of example 20 or some other example herein, wherein the request includes a hybrid automatic repeat request (HARQ)-identifier associated with the transport block.

Example 22 includes the method of example 20 or some other example herein, wherein determining the transport block was not successfully received comprises: receiving a negative acknowledgment from the target UE; or not receiving an expected positive acknowledgment from the target UE.

Example 23 includes the method of example 20 or some other example herein, further comprising: transmitting an indication of resources to be used by the assistant UE to transmit the transport block to the target UE.

Example 24 may include an apparatus comprising means to perform one or more elements of a method described in or related to any of examples 1-23, or any other method or process described herein.

Example 25 may include one or more non-transitory computer-readable media comprising instructions to cause an electronic device, upon execution of the instructions by one or more processors of the electronic device, to perform one or more elements of a method described in or related to any of examples 1-23, or any other method or process described herein.

Example 26 may include an apparatus comprising logic, modules, or circuitry to perform one or more elements of a method described in or related to any of examples 1-23, or any other method or process described herein.

Example 27 may include a method, technique, or process as described in or related to any of examples 1-23, or portions or parts thereof.

Example 28 may include an apparatus comprising: one or more processors and one or more computer-readable media comprising instructions that, when executed by the one or more processors, cause the one or more processors to perform the method, techniques, or process as described in or related to any of examples 1-23, or portions thereof.

Example 29 may include a signal as described in or related to any of examples 1-23, or portions or parts thereof.

Example 30 may include a datagram, information element, packet, frame, segment, PDU, or message as described in or related to any of examples 1-23, or portions or parts thereof, or otherwise described in the present disclosure.

Example 31 may include a signal encoded with data as described in or related to any of examples 1-23, or portions or parts thereof, or otherwise described in the present disclosure.

Example 32 may include a signal encoded with a datagram, IE, packet, frame, segment, PDU, or message as described in or related to any of examples 1-23, or portions or parts thereof, or otherwise described in the present disclosure.

Example 33 may include an electromagnetic signal carrying computer-readable instructions, wherein execution of the computer-readable instructions by one or more processors is to cause the one or more processors to perform the method, techniques, or process as described in or related to any of examples 1-23, or portions thereof.

Example 34 may include a computer program comprising instructions, wherein execution of the program by a processing element is to cause the processing element to carry out the method, techniques, or process as described in or related to any of examples 1-23, or portions thereof.

Example 35 may include a signal in a wireless network as shown and described herein.

Example 36 may include a method of communicating in a wireless network as shown and described herein.

Example 37 may include a system for providing wireless communication as shown and described herein.

Example 38 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed by one or more processors, cause processor circuitry to:
identify an assistant user equipment (UE);
generate information to be transmitted to the assistant UE, the information to enable the assistant UE to receive a downlink communication from a base station to a target UE;
generate a first request, to be transmitted to the base station, to enter an aggregation mode, wherein the first request includes an indication of a time required to process physical downlink shared channel transmissions received directly from base station and received from the assistant UE and provide an acknowledgment;
receive the downlink communication from the base station via the assistant UE; and
generate a second request for the downlink communication to be transmitted to the assistant UE, wherein the second request is to be transmitted as sidelink control information on a physical sidelink control channel or as negative-acknowledgment information on a physical uplink control channel.

2. The one or more non-transitory, computer-readable media of claim 1, wherein the information includes one or more radio network temporary identifiers (RNTIs), a bandwidth part configured for a target UE; a physical downlink control channel (PDCCH) configuration for a target UE; a PDSCH configuration for a target UE; or an expected time to receive the downlink communication.

3. The one or more non-transitory, computer-readable media of claim 1, wherein to identify the assistant UE, the processor circuitry is to:
determine the assistant UE and a target UE are associated with a same user;
determine the assistant UE is within a predefined range from a target UE;
determine the assistant UE has provided an indication that it is able to assist;
determine an expected proximity of the assistant UE to a target UE;
or
determine the assistant UE has sufficient capabilities to assist.

4. The one or more non-transitory, computer-readable media of claim 1, wherein the first request is uplink control information, an extended hybrid automatic repeat request-acknowledgment (HARQ-ACK), a scheduling request, or a physical random access channel transmission.

5. The one or more non-transitory, computer-readable media of claim 1, wherein to transmit the first request the processor circuitry is to:
transmit an indication of a transmission configuration indicator requested for the downlink communication.

6. The one or more non-transitory, computer-readable media of claim 1, wherein the instructions, when executed, further cause the processor circuitry to:
transmit, to the assistant UE, an indication of preconfigured resources to be used for transmitting the downlink communication to a target UE.

7. A method comprising:
identifying an assistant user equipment (UE);
generating information to be transmitted to the assistant UE, the information to enable the assistant UE to receive a physical downlink shared channel (PDSCH) transmission from a base station to a target UE;
generating a request, to be transmitted to the base station, to enter an aggregation mode, wherein the request includes an indication of a time required to process PDSCH transmissions received directly from base station and received from the assistant UE and provide an acknowledgment;
receiving a physical downlink control channel (PDCCH) transmission that schedules the PDSCH transmission;
receiving the PDSCH transmission from the assistant UE;
generating hybrid automatic repeat request (HARQ)-acknowledgment (ACK) information related to receiving the PDSCH transmission;
generating, for transmission in a first physical uplink control channel (PUCCH) resource allocated for the HARQ-ACK information, an indication that the HARQ-ACK information is not ready in time for transmission in the first PUCCH resource; and
outputting the HARQ-ACK information for transmission in a second PUCCH resource that is allocated for the HARQ-ACK information after the first PUCCH resource.

8. The method of claim 7, wherein the indication is to provide an offset between the first PUCCH resource and the second PUCCH resource.

9. A method comprising:
identifying an assistant user equipment (UE);
generating information to be transmitted to the assistant UE, the information to enable the assistant UE to receive a downlink communication from a base station to a target UE;

generating a first request, to be transmitted to the base station, to enter an aggregation mode, wherein the first request includes an indication of a time required to process physical downlink shared channel transmissions received directly from base station and received from the assistant UE and provide an acknowledgment;

receiving the downlink communication from the base station via the assistant UE; and generating a second request for the downlink communication to be transmitted to the assistant UE, wherein the second request is to be transmitted as sidelink control information on a physical sidelink control channel or as negative-acknowledgment information on a physical uplink control channel.

10. The method of claim 9, wherein the information includes one or more radio network temporary identifiers (RNTIs), a bandwidth part configured for a target UE; a physical downlink control channel (PDCCH) configuration for a target UE; a PDSCH configuration for a target UE; or an expected time to receive the downlink communication.

11. The method of claim 9, wherein identifying the assistant UE comprises:
    determining the assistant UE and a target UE are associated with a same user;
    determining the assistant UE is within a predefined range from a target UE;
    determining the assistant UE has provided an indication that it is able to assist;
    determining an expected proximity of the assistant UE to a target UE;
    or
    determining the assistant UE has sufficient capabilities to assist.

12. The method of claim 9, wherein the first request is uplink control information, an extended hybrid automatic repeat request-acknowledgment (HARQ-ACK), a scheduling request, or a physical random access channel transmission.

13. The method of claim 9, wherein the first request comprises an indication of a transmission configuration indicator requested for the downlink communication.

14. The method of claim 9, further comprising:
    outputting, for transmission to the assistant UE, an indication of preconfigured resources to be used for transmitting the downlink communication to a target UE.

15. The method of claim 9, wherein the downlink communication is a physical downlink shared channel (PDSCH) transmission and the method further comprises:
    receiving a physical downlink control channel (PDCCH) transmission that schedules the PDSCH transmission;
    receiving the PDSCH transmission from the assistant UE;
    generating hybrid automatic repeat request (HARQ)-acknowledgment (ACK) information related to receiving the PDSCH transmission;
    outputting, for transmission in a first physical uplink control channel (PUCCH) resource allocated for the HARQ-ACK information, an indication that the HARQ-ACK information is not ready in time for transmission in the first PUCCH resource; and
    outputting the HARQ-ACK information for transmission in a second PUCCH resource that is allocated for the HARQ-ACK information after the first PUCCH resource.

16. The method of claim 15, wherein the indication is to provide an offset between the first PUCCH resource and the second PUCCH resource.

* * * * *